J. J. SAMPSON.
RAKE SWEEP.
APPLICATION FILED SEPT. 15, 1914.

1,147,894.

Patented July 27, 1915.

Witnesses:
Pearl Stanton
O. C. Lindner

Inventor,
James J. Sampson, by
G. C. Kennedy
Attorney.

UNITED STATES PATENT OFFICE.

JAMES J. SAMPSON, OF WATERLOO, IOWA, ASSIGNOR OF ONE-HALF TO JAMES LEONARD, OF WATERLOO, IOWA.

RAKE-SWEEP.

1,147,894.      Specification of Letters Patent.      Patented July 27, 1915.

Application filed September 15, 1914. Serial No. 861,819.

*To all whom it may concern:*

Be it known that I, JAMES J. SAMPSON, a citizen of the United States of America, and a resident of Waterloo, Blackhawk county, Iowa, have invented certain new and useful Improvements in Rake-Sweeps, of which the following is a specification.

Figure 1:
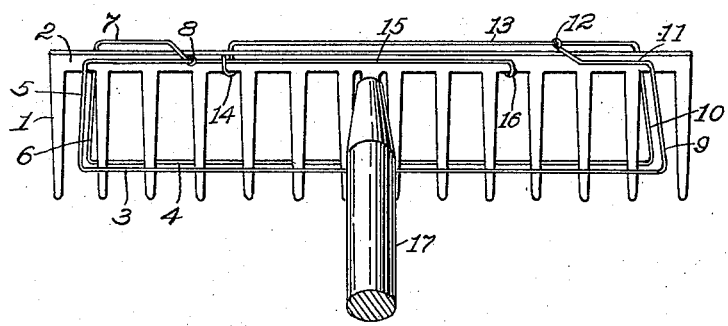
Figure 2:
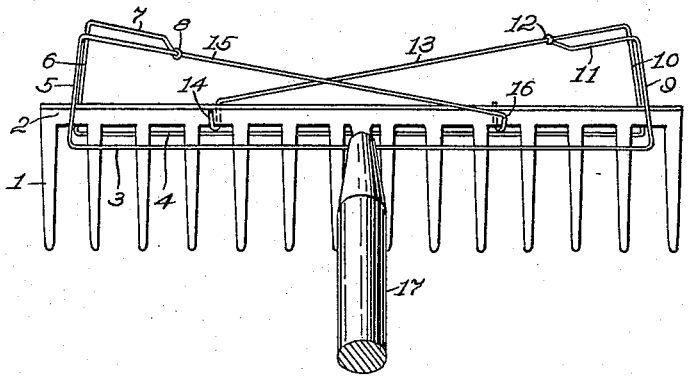
Figure 3:
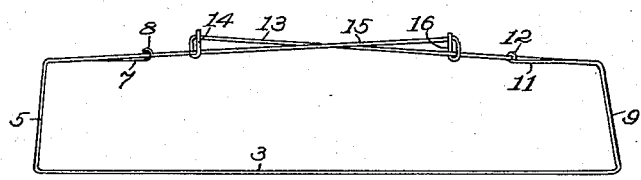
Figure 4:
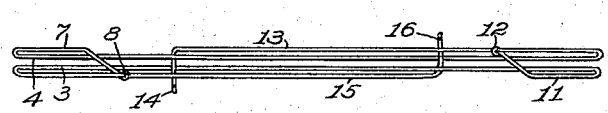

My invention relates to improvements in rake-sweeps, and the object of my improvement is to furnish a detachable resilient sweep or cleaning-device to a rake, which will be simple, inexpensive and effective in use. This object I have accomplished by the means which are hereinafter described and claimed, and which are illustrated in the accompanying drawings, in which:

Figure 1 is a perspective view of the head of a garden-rake, showing my improved sweep operatively connected therewith and mounted thereon movably, with the parts of the sweep in their extended or inert positions. Fig. 2 is a like view of a rake and the said sweep mounted thereon, the parts of the sweep being shown in the positions which they assume when under compression and pushed upwardly. Fig. 3 is a side elevation of the said sweep only, as detached from said rake. Fig. 4 is a plan view of the sweep shown in said Fig. 3.

Similar numerals of reference denote corresponding parts throughout the several views.

The rake shown in Figs. 1 and 2 is of the common or hand-operated garden variety, although it is to be understood that my improved sweep may with little or no modification be operatively mounted upon a rake of another description, whether hand- or power-propelled. The rake shown has a head-bar 2 provided with a plurality of spaced depending teeth 1, and having a fixed handle 17, which however, is shown broken away in the drawings.

My improved sweep is preferably formed from connected pieces of iron or other wire, which are bent at several points appropriately as shown to be mounted about the said rake-head 2 and its teeth 1.

The sweep is made of two elastic bars 3 and 4 arranged transversely across opposite faces of the teeth of said rake but stopping short of the end teeth thereof, and then having their ends bent upwardly and then toward each other horizontally parallel with the head-piece 2 and slightly above the latter. Each rod has the extremity at one end secured to the adjacent extremity of the other rod in the following manner: The opposite upturned parts 6 and 9, respectively, of said rods 4 and 3, have their bent over extremities 7 and 11, respectively, shorter than the extremities 13 and 15, respectively, of the other upright parts 10 and 5 of said rods. The shorter extremity 7 of the rod 4 is crossed over the head-piece 2 and secured at 8 to the longer extremity 15 of the rod 3 at a place spaced from the end of the rod. In a like manner, the shorter extremity 11 of the rod 3 is crossed over the head-piece 2 and secured at 12 to a place on the longer extremity 13 of the rod 4 spaced from its end. The terminations of the shorter extremities 7 and 11 may be secured at 8 and 12, respectively, by twisting such terminations about the other rods or by brazing them thereon, or otherwise securing them. The longer extremities 13 and 15 have terminal hooks 14 and 16, respectively, which are secured about the head-piece 2 at places thereof intermediate between its center and ends, the said longer extremities extending past each other in parallel relation on opposite sides of said head piece.

The normal position of the parts of the sweep, when not under compression, are as shown in said Fig. 1, wherein the parts 3 and 4 lie across the teeth 1 near their points.

Fig. 2 shows the positions assumed by the parts of the sweep when under compression, that is, as if the parts 3 and 4 were pushed upwardly by a mass of leaves or rubbish gathered by the teeth thereunder in raking. Since the parts of the sweep are elastic, it is evident that when the rake is lifted, these parts will react and eject the gathered rubbish from the teeth. Since the terminal hooks of the longer extremities 13 and 15 are connected to the head-piece at places spaced away from the ends of the rake, the sweep, as a whole, is permitted to tilt yieldingly at either end in case compression is exercised therefrom only at such end, therefore, the sweep will freely act and discharge rubbish from either side thereof without binding. Since the sweep is made of but the two pieces of wire or light rod, or some suitable material such as iron or steel, it is very inexpensive, and is also easily mounted or demounted from the rake.

Having described my invention, what I claim as new, and desire to secure by Letters Patent is:

1. A rake-sweep, comprising in combination, a rake having a plurality of teeth fixed on a head-piece, a sweep mounted thereon comprising a rod located across said teeth, and yieldable resilient connections between said rod and said head-piece adapted to permit said rod to swing up longitudinally along said teeth at either end of the rake when pushed upwardly at that end.

2. A rake-sweep, comprising in combination, a rake having a plurality of teeth fixed on a head-piece, a sweep mounted thereon comprising a rod located across said teeth, and yieldable resilient connections between the extremities of said rod and spaced places on said head-piece located intermediately between the center and ends thereof to allow free tiltable upward movement to the rod when pushed upward from below.

3. A rake-sweep, comprising in combination, a rake having a plurality of teeth fixed on a head-piece, a sweep mounted thereon comprising rods respectively located across opposite faces of said teeth and having their ends bent upwardly across said head-piece, one end of one rod and an opposite end of the other rod being bent over to be parallel with each other and said head-piece with their extremities secured to the head-piece, the other end of the first-mentioned rod and the opposite end of the second-mentioned rod being bent over parallel with said head-piece and having their extremities secured to the first-mentioned parallel ends at places spaced from the ends of the sweep.

4. A rake-sweep, comprising in combination, a rake having a plurality of teeth fixed on a transverse head-piece, a sweep mounted detachably thereon and comprising two resilient rods placed transversely upon opposite faces of the rake teeth, and having their ends bent first upwardly and then toward each other along the head-piece, the extremities of each rod being of different lengths with the extremities of the rods arranged in adjacent reversed relation, the shorter extremities being secured to medial parts of the longer extremities, and the terminations of the longer extremities being secured to parts of said head-piece between its center and ends.

Signed at Waterloo, Iowa, this 27th day of August, 1914.

JAMES J. SAMPSON.

Witnesses:
  GEO. C. KENNEDY,
  PEARL STANTON.